United States Patent
George

(10) Patent No.: US 8,337,316 B2
(45) Date of Patent: Dec. 25, 2012

(54) SEALED PTO DAMPER

(75) Inventor: Philip George, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 233 days.

(21) Appl. No.: 12/754,255

(22) Filed: Apr. 5, 2010

(65) Prior Publication Data
US 2010/0252390 A1  Oct. 7, 2010

Related U.S. Application Data

(60) Provisional application No. 61/212,018, filed on Apr. 6, 2009.

(51) Int. Cl.
*F16F 15/123* (2006.01)

(52) U.S. Cl. .................................... 464/68.1

(58) Field of Classification Search ........... 464/30, 464/40, 66.1, 68.1, 68.9, 68.5, 68.3; 192/30 V, 192/55.1, 55.61, 56.1, 56.2, 70.17, 204, 212, 192/213.11, 213.12, 213.21–214.1; 74/11, 74/411
See application file for complete search history.

(56) References Cited

U.S. PATENT DOCUMENTS

| | | | | |
|---|---|---|---|---|
| 791,329 A * | 5/1905 | Dodge, J.M. | ............... | 464/66.1 |
| 1,510,943 A * | 10/1924 | Kjelsberg | ................ | 464/66.1 |
| 1,561,506 A | 11/1925 | Chilton | | |
| 4,891,033 A * | 1/1990 | Heyser | ................ | 192/212 |
| 4,905,539 A * | 3/1990 | Naudin et al. | | |
| 5,111,714 A * | 5/1992 | Honoki et al. | ............ | 192/214.1 |
| 5,307,710 A * | 5/1994 | Feldhaus et al. | | |
| 5,398,562 A * | 3/1995 | Muchmore | | |
| 5,503,595 A * | 4/1996 | Rohrle | | |
| 5,649,864 A * | 7/1997 | Rohrle et al. | ............. | 192/214.1 |
| 5,984,789 A * | 11/1999 | Reik et al. | ................ | 464/68.5 |
| 6,231,449 B1 | 5/2001 | Youngerman et al. | | |
| 2006/0289263 A1 * | 12/2006 | Friedmann et al. | ........ | 192/55.61 |
| 2007/0199787 A1 * | 8/2007 | Graf et al. | ................ | 192/55.61 |

* cited by examiner

*Primary Examiner* — Gregory Binda
*Assistant Examiner* — Josh Skroupa
(74) *Attorney, Agent, or Firm* — Simpson & Simpson, PLLC

(57) ABSTRACT

A torsion damper including a plurality of elastic elements, a first plate drivingly engaged with the plurality of elastic elements and adapted to drivingly engage with a transmission shaft, a gear, and a second plate drivingly engaged with the gear and the plurality of elastic elements. At least one of the first or second plate is adapted to hydraulically seal with respect to a housing for the transmission. The gear may be adapted to be a power take-off gear for the transmission.

14 Claims, 3 Drawing Sheets

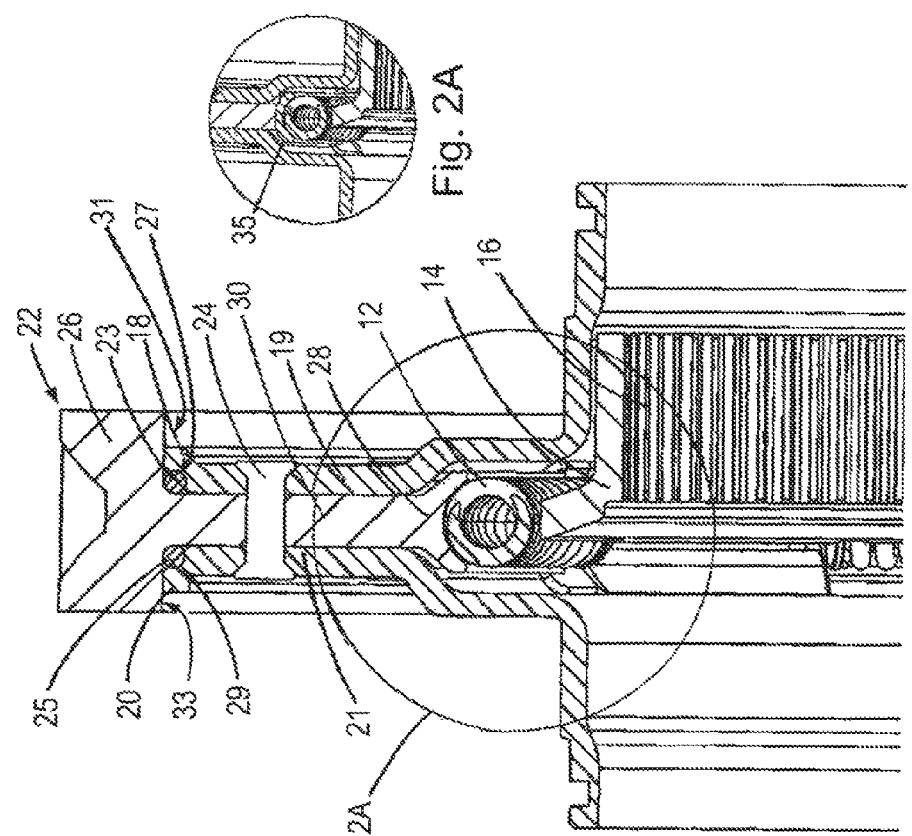
Fig. 2A
Fig. 2
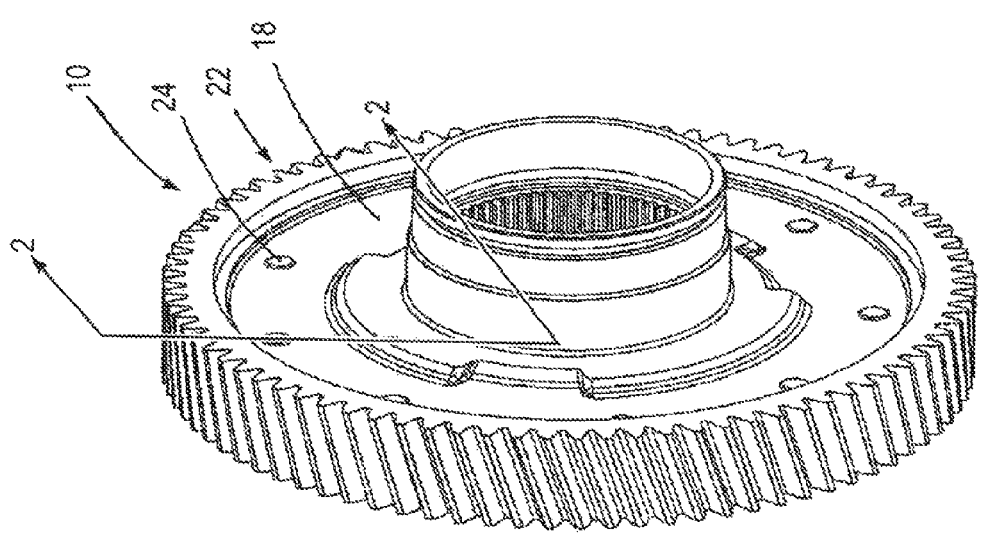
Fig. 1

SEALED PTO DAMPER

CROSS-REFERENCE TO RELATED APPLICATIONS

This application claims the benefit under 35 U.S.C. §119 (e) of U.S. Provisional Application No. 61/212,018, filed Apr. 6, 2009 which application is incorporated herein by reference.

FIELD OF THE INVENTION

The invention relates generally to a torsion damper, and more specifically to a sealed damper for a transmission power take-off.

BACKGROUND OF THE INVENTION

Prior art torsion dampers generally include coil springs for isolating drivetrain vibrations. Many designs position the coil springs between cover plates and drivingly engage the springs with the cover plates and a flange. The prior art includes at least one design in which an additional plate is fixed to the cover plates to provide a portion of the radial support for the coil springs and a rotational limit between the flange and cover plates. Another design for an engine starter includes a gear fixedly connected to a plate elastically connected to the flange by the coil springs.

BRIEF SUMMARY OF THE INVENTION

Example aspects of the present invention broadly comprise a torsion damper including a plurality of elastic elements, a first plate drivingly engaged with the plurality of elastic elements and adapted to drivingly engage with a transmission shaft, a gear, and a second plate drivingly engaged with the gear and the plurality of elastic elements. At least one of the first or second plate is adapted to hydraulically seal with respect to a housing for the transmission. The gear may be adapted to be a power take-off gear for the transmission.

In some example embodiments of the invention, the gear includes a toothed portion and a portion radially inside the toothed portion. The portion radially inside the toothed portion is arranged to provide radial support to the elastic elements. In an example embodiment of the invention, the gear includes a connector portion radially disposed between the toothed portion and the portion radially inside the toothed portion. The gear is fixedly connected to the second plate at the connector portion. The elastic elements may be arcuately-formed coil springs and the torsion damper may include a plurality of raceways disposed between the coil springs and the radially inside portion.

In an example embodiment of the invention, the first plate and the gear are directly drivingly engaged for a torque applied to the first plate greater than a selected damper torque. In an example embodiment of the invention, the first plate or the gear includes at least one radially extending tab and the other of the first plate or the gear includes at least one window. The first plate and the gear are directly drivingly engaged by contact between the at least one radially extending tab and the at least one window for a torque applied to the first plate greater than a selected damper torque.

In some example embodiments of the invention, the torsion damper includes a third plate and the second plate and the third plate are each hydraulically sealed to the gear and to the transmission housing. In an example embodiment of the invention, the torsion damper includes at least one o-ring, at least one of the second or third plates includes a circumferential notch for accepting the o-ring, and the plate is sealed to the gear by the o-ring. In some example embodiments of the invention, the second plate radially locates the gear. In an example embodiment of the invention, the second plate is adapted to be radially located by a bearing in the transmission.

Other example aspects of the present invention broadly comprise a torsion damper including a first plate with a first radial wall and a first cylindrical protrusion, a second plate with a second radial wall and a second cylindrical protrusion, and a gear fixedly connected to and hydraulically sealed to the first and second plates. The first protrusion is adapted to be radially located by a first transmission bearing and the second protrusion is adapted to be radially located by a second transmission bearing.

Other example aspects of the present invention broadly comprise a torsion damper including a plurality of elastic elements, a first plate at a first longitudinal end of the torsion damper, a gear, and a second plate at a second longitudinal end of the torsion damper. The first plate is drivingly engaged with the plurality of elastic elements and adapted to drivingly engage with a transmission shaft. The second plate is drivingly engaged with the gear and the plurality of elastic elements. In an example embodiment of the invention, the torsion damper includes an annular space at least partially formed by the first and second plates. The annular space is adapted to form a sealed channel with the transmission shaft between the first and second longitudinal ends.

BRIEF DESCRIPTION OF THE DRAWINGS

The nature and mode of operation of the present invention will now be more fully described in the following detailed description of the invention taken with the accompanying drawing figures, in which:

FIG. 1 is a perspective view of a torsion damper according to an example aspect of the invention;

FIG. 2 is a top-half section view of the torsion damper shown in FIG. 1 generally along line 2-2 in FIG. 1;

DETAILED DESCRIPTION OF THE INVENTION

Figure 3:
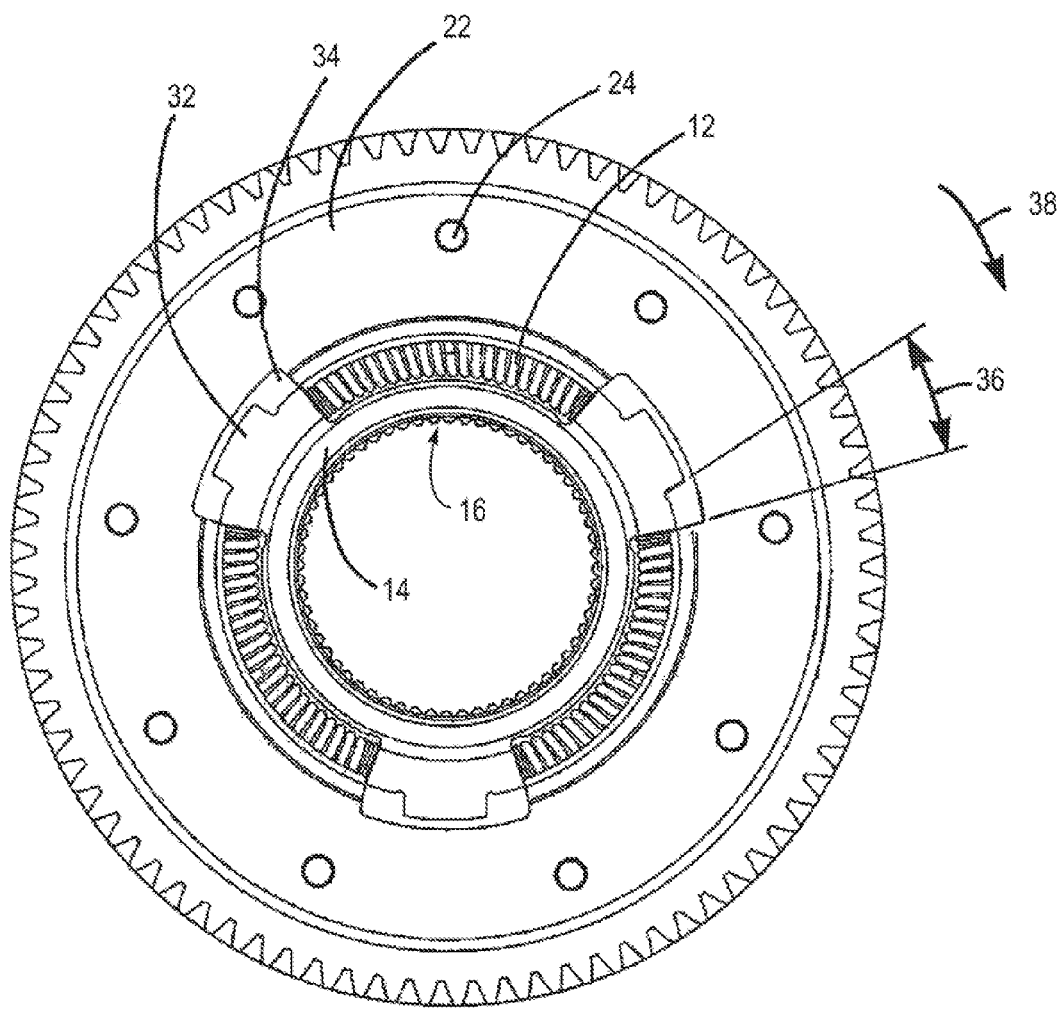
FIG. 3 is a front view of the damper shown in FIG. 1 with a plate removed for clarity.

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

The following description is made with reference to FIGS. 1 and 2. FIG. 1 is a perspective view of torsion damper 10 according to an example aspect of the invention. FIG. 2 is a top-half section view of torsion damper 10 shown in FIG. 1 generally along line 2-2 in FIG. 1. Torsion damper 10 includes elastic elements 12. In some example embodiments of the invention, elements 12 are coil springs. In an example embodiment of the invention, the coil springs are arcuately formed.

Torsion damper 10 includes plate 14. Plate 14 is adapted to engage with a transmission shaft (not shown) at spline 16, for example, and elastic elements 12. Damper 10 further includes plates 18 and 20. Plates 18 and 20 include radial walls 19 and 21, respectively. Walls 19 and 21 are drivingly engaged with gear 22 at rivet 24, for example. Although plates 18 and 20 are both shown riveted to gear 22, in other embodiments of the invention only one of plates 18 or 20 may be attached to gear 22 and the plate(s) may be attached using any method known in the art, including welding, brazing, or staking, for example.

Plates 18 and 20 are hydraulically sealed to gear 22. In an example embodiment of the invention, plates 18 and 20 are hydraulically sealed to gear 22 by o-ring seals 23 and 25, respectively, disposed in circumferential notches 27 and 29, respectively. Plates 18 and 20 radially locate gear 22. That is, plates 18 and 20, and gear 22, are designed to have minimal clearance such that plates 18 and 20 fit tightly against bores 31 and 33 of gear 22, respectively. Alternately stated, a radial position of gear 22 is established by contact between plates 18 and 20 and the gear. Although plates 18 and 20 are both shown sealed to and locating gear 22, in other embodiments of the invention only one of plates 18 or 20 may be sealed to and/or locate gear 22. Gear 22 may be a helical gear or spur gear, for example. In an example embodiment of the invention, gear 22 is a power take-off (PTO) gear for a medium or heavy duty over-the-road transmission in a dump truck or garbage truck, for example.

In some example embodiments of the invention, gear 22 includes toothed portion 26 and portion 28 radially inside of toothed portion 26. Portion 28 is arranged to provide radial support to elastic elements 12. That is, when damper 10 is under rotation, portion 28 reacts centrifugal force exerted by elements 12. In an example embodiment of the invention (FIG. 2A), raceway 35 is disposed between element 12 and portion 28. Raceway 35 may be used to better support elements 12 and prevent wear on gear 22, advantageously reducing required hardness for wear resistance on gear 22. Gear 22 is fixedly connected to plates 18 and 20 at portion 30 disposed radially between portions 26 and 28.

The following description is made with reference to FIGS. 1-3. FIG. 3 is a front view of damper 10 shown in FIG. 1 with plate 20 removed for clarity. Plate 14 includes tab 32 and gear 22 includes window 34. Although plate 14 is shown with tab 32 and gear 22 is shown with window 34, in other embodiments of the invention, plate 14 may have window 34 and gear 22 may have tab 32. Tab 32 and window 34 are arranged to be directly drivingly engaged when plate 14 is rotated by angle 36 in direction of angle 38. That is, when a circumferential force from a torque received by plate 14 through spline 16 exceeds a force exerted by elements 12 at relative rotational angle 36, in other words, is greater than a selected damper torque, the remaining force (and associated torque) is directly transmitted from plate 14 to gear 22 at the tab-window connection. The directly drivingly engaged connection between plate 14 and gear 22 provides improved durability of elements 12 by bypassing elements 12 (transmitting torque directly from plate 12 to gear 22) when torque passing through torsion damper 10 exceeds rated torque for elements 12.

Figure 4:
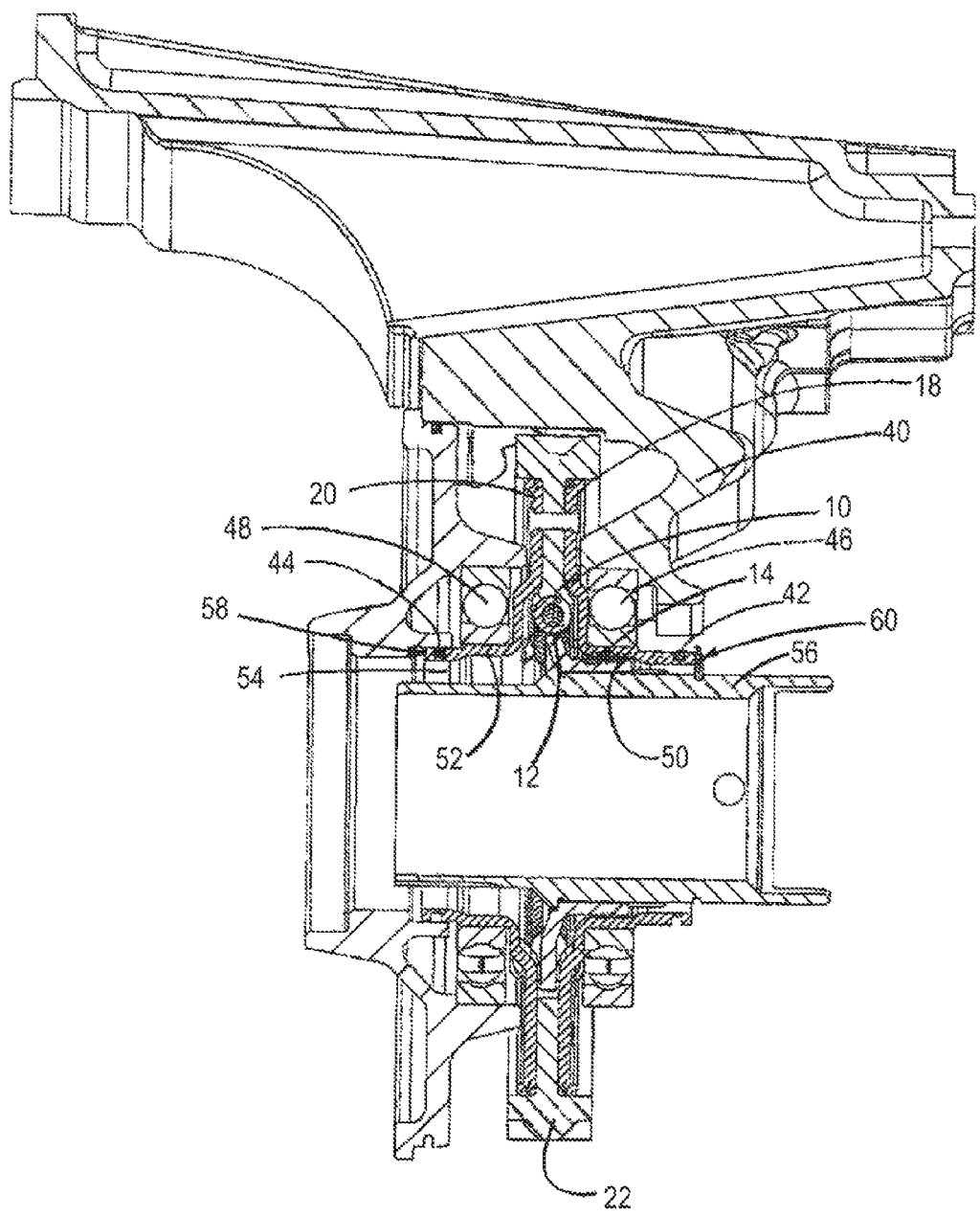
FIG. 4 is a cross-sectional view of the torsion damper shown disposed in a portion of a transmission housing.

The following description is made with reference to FIG. 4. FIG. 4 is a cross-sectional view of torsion damper 10 shown disposed in a portion of transmission housing 40. In one embodiment, plates 18 and 20 are hydraulically sealed to transmission housing 40 with respective seals at seal channels 42 and 44, for example. Although plates 18 and 20 are both shown sealed to transmission housing 40, in other embodiments plate 18 and/or 20 may be sealed to another transmission component such as a shaft, bearing, or gear, for example. Furthermore, plate 14 may be sealed to housing 40 or another transmission component.

Transmission bearings 46 and 48 radially locate plates 18 and 20, respectively. That is, bearings 46 and 48 are tightly fitted into housing 40 and cylindrical protrusions 50 and 52 of plates 18 and 20, respectively, are tightly fitted to the bearings. Alternately stated, respective radial positions of plates 18 and 20 are established by contact between plates 18 and 20 and the bearings. Although both plates 18 and 20 are shown positioned by bearings, in other embodiments only one of plates 18 and 20 may be positioned by a bearing. Bearings 46 and 48 provide radial and axial support to plates 18 and 20 to react operating loads exerted on plates 18 and 20 by gear 22.

Seals 23, 25, 42, and 44 provide sealed channel 54 between torsion damper 10 and transmission shaft 56. For example, plates 18 and 20 form at least part of an annular space between longitudinal ends 58 and 60 of the damper. In combination with shaft 56, the annular space forms channel 54 between longitudinal ends 58 and 60 of the damper. Transmission shaft 56 may be engaged with a pump hub (not shown) of a torque converter (not shown) for the transmission. Channel 54 may be used for exchange of fluid with the torque converter. Furthermore, torsion damper 10 advantageously improves rattle between gear 22 and a driven gear (not shown). Damper 10 may be designed with low torque transmission through elements 12 to reduce rattle during a condition when a driven device such as a hydraulic pump (not shown) or PTO clutch (not shown) is disengaged. That is, torsional fluctuations from an engine in drivingly engaged with the torque converter are at least partially isolated from gear 22 by elements 12 when the PTO clutch is disengaged.

Of course, changes and modifications to the above examples of the invention should be readily apparent to those having ordinary skill in the art, without departing from the spirit or scope of the invention as claimed. Although the invention is described by reference to specific preferred and/ or example embodiments, it is clear that variations can be made without departing from the scope or spirit of the invention as claimed.

What I claim is:
1. A torsion damper comprising:
a plurality of elastic elements;
a first plate drivingly engaged with the plurality of elastic elements and adapted to drivingly engage with a transmission shaft;
a gear; and
second and third plates drivingly engaged with the gear and drivingly engaged with the plurality of elastic elements, wherein at least one of the first, second, or third plates is adapted to hydraulically seal to a housing for a transmission.

2. The torsion damper of claim 1, wherein the gear is adapted to be a power take-off gear for the transmission.

3. The torsion damper of claim 1, wherein the gear comprises a toothed portion and a portion radially inside the toothed portion, and the portion radially inside the toothed portion is arranged to provide radial support to the elastic elements.

4. The torsion damper of claim 3, wherein the gear comprises a connector portion radially disposed between the toothed portion and the portion radially inside the toothed portion, and the gear is fixedly connected to the second plate at the connector portion.

5. The torsion damper of claim 3, wherein the elastic elements are arcuately-formed coil springs.

6. The torsion damper of claim 3, further comprising a plurality of raceways disposed between the coil springs and the radially inside portion.

7. The torsion damper of claim 1, wherein the first plate and the gear are directly drivingly engaged for a torque applied to the first plate greater than a selected damper torque.

8. The torsion damper of claim 1, wherein the first plate or the gear includes at least one radially extending tab and the other of the first plate or the gear includes at least one window and wherein for a torque applied to the first plate greater than a selected damper torque, the first plate and the gear are directly drivingly engaged by contact between the at least one radially extending tab and the at least one window.

9. The torsion damper of claim 1, wherein the second plate and the third plate are each hydraulically sealed to the gear and to the transmission housing.

10. The torsion damper of claim 9, further comprising at least one o-ring, wherein at least one of the second or third plates comprises a circumferential notch for accepting the o-ring, and the plate is sealed to the gear by the o-ring.

11. The torsion damper of claim 1, wherein the second plate radially locates the gear.

12. The torsion damper of claim 11, wherein the second plate is adapted to be radially located by a bearing in the transmission.

13. A torsion damper comprising:
a plurality of elastic elements;
a first plate engaged with the plurality of elastic elements, with a first radial wall and a first cylindrical protrusion, the first protrusion adapted to be radially located by a first transmission bearing;
a second plate engaged with the plurality of elastic elements, with a second radial wall and a second cylindrical protrusion, the second protrusion adapted to be radially located by a second transmission bearing; and
a gear fixedly connected to and hydraulically sealed to the first and second plates, wherein the plurality of elastic elements and the first and second transmission bearings are at least partially aligned in a direction parallel to an axis of rotation for the torsion damper.

14. A torsion damper comprising:
a plurality of elastic elements;
a first plate drivingly engaged with the plurality of elastic elements and adapted to drivingly engage with a transmission shaft;
a gear;
second and third plates drivingly engaged with the gear and the plurality of elastic elements; and,
an annular space at least partially formed by the first and second plates, wherein the annular space is adapted to form a sealed channel with the transmission shaft; and wherein a portion of the gear is disposed between the second and third plates in a direction parallel to an axis of rotation for the torsion damper.

* * * * *